United States Patent [19]
Alderman et al.

[11] Patent Number: 6,137,351
[45] Date of Patent: Oct. 24, 2000

[54] UNIVERSAL CURRENT SOURCE AND CURRENT SINK INTERFACE

[75] Inventors: Richard A. Alderman; S. Todd Sanders, both of Freeport, Ill.

[73] Assignee: Honeywell International Inc, Morrsitown, N.J.

[21] Appl. No.: 09/322,091

[22] Filed: May 28, 1999

[51] Int. Cl.[7] .................................................. G06G 7/12
[52] U.S. Cl. ........................ 327/563; 327/561; 327/333
[58] Field of Search .................... 327/560–563, 327/52, 63, 65, 77, 89, 354, 333, 72; 326/62

[56] References Cited

U.S. PATENT DOCUMENTS

| | | | |
|---|---|---|---|
| 3,731,232 | 5/1973 | Hekimian | 327/133 |
| 4,035,733 | 7/1977 | Morrow et al. | 327/166 |
| 4,392,068 | 7/1983 | Welles, II | 327/563 |
| 4,495,428 | 1/1985 | Ishigaki | 327/306 |
| 4,689,499 | 8/1987 | Yee . | |

*Primary Examiner*—Toan Tran
*Attorney, Agent, or Firm*—Pauley Petersen Kinne & Fejer; Kris T. Fredrick

[57] ABSTRACT

An interface circuit for interfacing a data bus with a current sinking sensor or a current sourcing sensor. An input terminal is connected between a cathode of a first diode and an anode of a second diode. The anode of the first diode is connected to a first input terminal of a comparator, such as a differential amplifier. The cathode of the second diode is connected to a second input of the comparator. Two pairs of in-series resistors are connected between a voltage supply. The anode of the first diode is connected between two resistors of the first pair of resistors. The cathode of the second diode is connected between two resistors of the other pair of resistors. An output of the comparator is connected to an output terminal. The interface circuit of this invention can be connected between an input circuit and an output circuit, to interface a sensor parameter and the corresponding input current or signal to the data bus and a corresponding output current or signal.

11 Claims, 1 Drawing Sheet

UNIVERSAL CURRENT SOURCE AND CURRENT SINK INTERFACE

BACKGROUND OF THE INVENTION

1. Field of the Invention

This invention relates to a circuit and method for universally interfacing a sensor, regardless of whether current sourcing or current sinking, with a data bus.

2. Description of Related Art

Conventional current sinking sensors vary current from a current source, typically as a function of a sensed parameter. Conventional current sourcing sensors vary a current supply, also as a function of a sensed parameter.

Certain conventional interface circuits, such as those used with programmable controllers, have a mechanical selector switch for choosing between operating modes of an interface circuit or to select either a current sinking input or a current sourcing input.

U.S. Pat. No. 4,689,499 discloses an electronic circuit having two levels of comparators and associated circuitry that define two threshold levels between which neither comparator is actuated. In response to current flowing from or into a sensor terminal, a sensor input terminal has an input current that varies outside of a window of the threshold levels. Comparator output terminals are each connected to a separate output circuit which produces a signal that can be transmitted on a data bus, in response to actuation of either comparator.

Many conventional interface circuits have no capability to universally accept inputs from either type of sensor, a current sourcing sensor or a current sinking sensor. Other conventional interface circuits can indiscriminately accept inputs from either a current sourcing sensor or a current sinking sensor, but many conventional interface circuits require multiple levels or subcircuits, which increases the cost for a universal interface.

There is apparent need for a simple and low cost interface circuit that can produce an output signal or no output signal as a function of an input current from either a current sourcing sensor or a current sinking sensor.

SUMMARY OF THE INVENTION

It is one object of this invention to provide an interface circuit that can universally accept an input current from either a current sourcing sensor or a current sinking sensor, particularly without requiring user selection or intervention.

It is another object of this invention to provide an interface circuit that can universally accept an input current from either a current sourcing sensor or a current sinking sensor, with reduced circuitry and electrical components.

It is still another object of this invention to provide an interface circuit that reduces the number of necessary comparators and/or subcircuits.

The above and other objects of this invention are accomplished with an interfacing circuit having a pair of steering diodes. An input terminal is connected between two of the steering diodes. An anode of one of the steering diodes is preferably connected to a non-inverting input of a comparator. A cathode of the other diode of the steering diodes is preferably connected to an inverting input of the comparator. The input terminal is preferably connected to a cathode of the one diode and an anode of the other diode.

In one preferred embodiment according to this invention, the comparator comprises a differential amplifier. The differential amplifier preferably operates with an open collector output. In another preferred embodiment of this invention, the comparator comprises an operational amplifier. However, an operational amplifier likely does not provide as high of gain, hence switches slower.

In one preferred embodiment of this invention, two pairs of resistors are connected with respect to each other, the steering diodes and the comparator, to provide a voltage difference across both inputs of the comparator. In one preferred embodiment of this invention, the anode of the one diode is connected between the first pair of resistors which are arranged in series. In such embodiment, the cathode of the other diode is connected between the second pair of resistors which are arranged in series.

A voltage difference from a voltage supply, preferably but not necessarily the same voltage difference, is applied across both pairs of resistors. In one embodiment of this invention, the voltage supply is preferably but not necessarily taken from voltage supply connections of the comparator.

The comparator has an output connected to an output terminal. In one preferred embodiment of this invention, a resistor is connected between the output of the comparator and the same or a different voltage supply. Such resistor is used when the comparator operates with an open collector output.

The interface circuit of this invention requires relatively few electrical components. Also, the interface circuit of this invention can be used universally with an input current from either a current sourcing sensor or a current sinking sensor.

DESCRIPTION OF PREFERRED EMBODIMENTS

Figure 1:
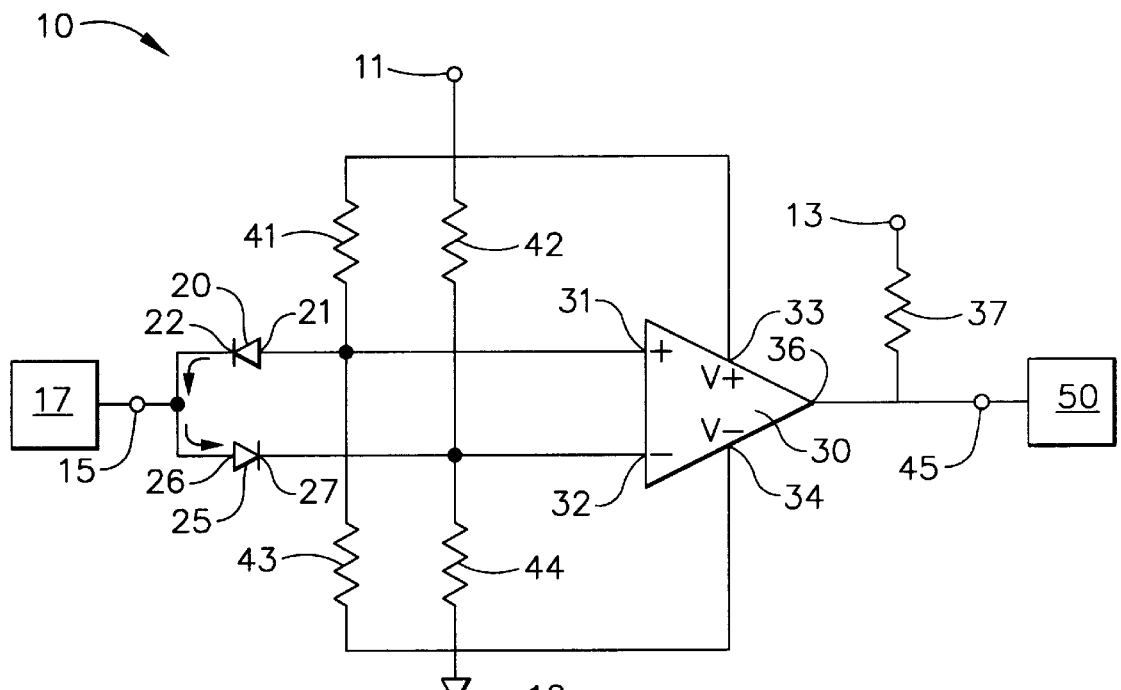
FIG. 1 is a circuit diagram showing an interface circuit, according to one preferred embodiment of this invention.

FIG. 1 shows a circuit diagram of interface circuit 10, according to one preferred embodiment of this invention. Interface circuit 10 comprises input terminal 15 and output terminal 45. Interface circuit 10 of this invention is primarily directed to the electrical components between input terminal 15 and output terminal 45. Input terminal 15 can be connected to a suitable input circuit 17 and/or output terminal 45 can be connected to a suitable output circuit 50.

U.S. Pat. No. 4,689,499 teaches an electronic circuit for interfacing a sensor of either a current sourcing type or a current sinking type, with a data bus. The entire disclosure of U.S. Pat. No. 4,689,499 is incorporated into this specification by reference. U.S. Pat. No. 4,689,499 teaches a first level comparator circuit and a second level comparator circuit. With interface circuit 10 according to this invention, the same result of interfacing a data bus with a current sourcing sensor or a current sinking sensor can be accomplished with only one comparator circuit.

Interface circuit 10 of this invention can replace the circuit defined by the electrical components between voltage supply conductors 15 and 16, input terminal 26 and a connection of the cathodes of diodes 32 and 33, all as shown in FIG. 1 of U.S. Pat. No. 4,689,499.

For example, interface circuit 10 of this invention can replace the interface circuit taught by U.S. Pat. No. 4,689,499, so that input terminal 15 of this invention connects at input terminal 26 of the circuit taught by U.S. Pat. No. 4,689,499. Output terminal 45 of this invention can be connected at the connection of the cathodes of diodes 32 and 33 as taught by U.S. Pat. No. 4,689,499. Voltage terminal 11 of this invention can be connected at conductor 16 as taught by U.S. Pat. No. 4,689,499. Voltage terminal 12 of this invention can be connected at conductor 15 as taught by U.S. Pat. No. 4,689,499.

Although interface circuit 10 of this invention can operate with the remaining input device 11 and output circuit 34 taught by U.S. Pat. No. 4,689,499, it is apparent that interface circuit 10 of this invention can be used with other input devices or input circuits and/or other output circuits, to accomplish the same result of ultimately interfacing a sensor parameter with a data bus.

As used throughout the specification and in the claims, the term diode is intended to be interchangeable with a demodulator, a rectifier, a limiter, a nonlinear resistor or any other suitable current rectifying device. Also as used throughout this specification and in the claims, the term resistor is intended to relate to any suitable current limiting device, as known to those skilled in the art of electronics.

Referring to interface circuit 10 as shown in FIG. 1, a pair of steering diodes or directional diodes are formed by diodes 20 and 25. Input terminal 15 is connected to cathode 22 of diode 20 and is also connected to anode 26 of diode 25.

Anode 21 of diode 20 is connected to input terminal 31 of comparator 30. Cathode 27 of diode 25 is connected to input terminal 32 of comparator 30. In one preferred embodiment according to this invention, comparator 30 comprises a differential amplifier, preferably operating with an open collector output. It is apparent that comparator 30 may comprise an operational amplifier but the operational amplifier likely does not provide the level of gain or open collector output provided by the differential amplifier.

As shown in FIG. 1, according to one preferred embodiment of this invention, input terminal 31 of comparator 30 is a non-inverting input and input terminal 32 of comparator 30 is an inverting input In such preferred embodiment, the direction or orientation of diodes 20 and 25 can be interchanged as long as the orientation of input terminals 31 and 32 are correspondingly interchanged and resistors 41–44 are re-sized or re-connected.

In one preferred embodiment of this invention, two pairs of resistors 41, 43 and 42, 44 are used to establish a voltage difference across input terminals 31 and 32 of comparator 30. Comparator 30 drives or sinks a current or a signal at output 36 of comparator 30, as a function of a magnitude and/or a direction of the voltage difference across input terminal 31 and 32.

In one preferred embodiment of this invention, resistors 41 and 43 are connected in series. Anode 21 of diode 20 and thus input terminal 31 are connected between resistors 41 and 43. Resistors 42 and 44 are preferably connected in series. Cathode 27 of diode 25 and thus input terminal 32 are connected between resistors 42 and 44.

A voltage supply is connected across each pair of series resistors 41, 43 and 42, 44, for example using voltage terminals 11 and 12 as shown in FIG. 1. Voltage supply terminals 33 and 34 of comparator 30 can be used to supply voltage across voltage terminals 11 and 12. However, it is apparent that any other suitable external voltage source, such as a battery, a voltage regulator or another suitable voltage circuit, can be used to apply a voltage across voltage terminals 11 and 12.

Figure 2:
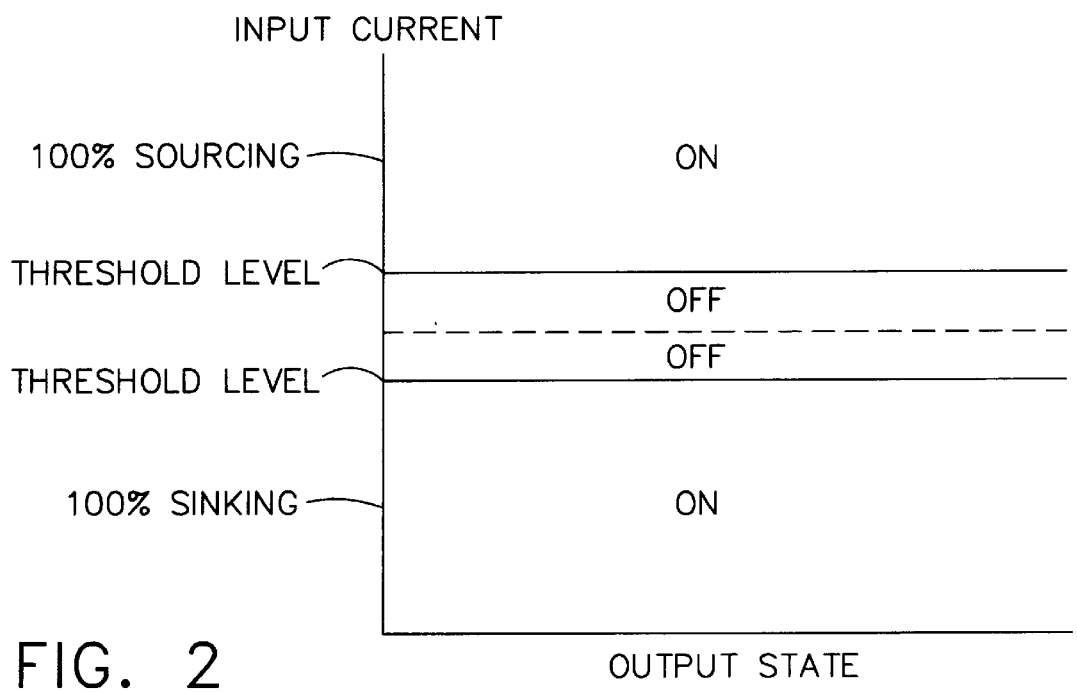
FIG. 2 is a graph showing input current versus output state for an interface circuit, according to one preferred embodiment of this invention.

FIG. 1 shows resistors 41–44 each as a single resistor. However, it is apparent that any one or more of resistors 41–44 may comprise a single resistor or a bank of resistors arranged in series and/or parallel. The impedance values of resistors 41–44 can be designed to provide a desired magnitude and direction of a voltage difference across input terminals 31 and 32 of comparator 30. The different impedance values will dictate the window size or the threshold level, as shown in FIG. 2. In one preferred embodiment according to this invention, comparator 30 is in an off mode when a referenced threshold level, established by the impedance values of resistors 41–44, is between the threshold levels shown in FIG. 2. When comparator 30 operates in the off mode, interface circuit 10 is in a static state and comparator 30 is off. When the reference level varies outside of the threshold levels, regardless of whether the input current is sourcing or sinking, comparator 30 operates in an on mode.

As shown in FIG. 1, diodes 20 and 25 steer current in the directions shown by the arrows in FIG. 1. With an input current from a current sinking source, current flows through diode 20 and is drawn into the sensor or input circuit 17. With a current sourcing input, current flows through diode 25 and is supplied by the sensor or input circuit 17. It is apparent that diodes 20 and 25 can be designed and sized according to desired input conditions and/or desired output conditions.

In one preferred embodiment according to this invention, as shown in FIG. 1, when comparator 30 comprises a differential amplifier operating with an open collector output, resistor 37 is connected between output terminal 45 and voltage terminal 13. Resistor 37 may comprise a single resistor or a bank of resistors arranged in series and/or parallel. The voltage supplied at voltage terminal 13 can be connected to voltage terminal 11 or any other suitable voltage supply.

In one preferred embodiment of this invention, output terminal 45 is connected to output circuit 50 that comprises an optoelectronic isolator and an output section connected to a data bus. In another preferred embodiment according to this invention, output terminal 45 is connected directly to the data bus.

While in this specification this invention is described in relation to certain preferred embodiments, and many details are set forth for purpose of illustration, it is apparent to those skilled in the art that this invention is susceptible to additional embodiments and that certain of the details described can be varied considerably without departing from the desired results and the basic principles of this invention.

We claim:

1. In a circuit for interfacing a data bus with one of a current sinking sensor and a current sourcing sensor, the improvement comprising:

an input terminal;

a first diode, a second diode, the input terminal connected to a cathode of the first diode and to an anode of the second diode;

a comparator, an anode of the first diode connected to a first input terminal of the comparator, a cathode of the second diode connected to a second input terminal of the comparator;

a first current limiter and a third current limiter connected in series across a voltage supply, a second current limiter and a fourth current limiter connected in series across the voltage supply, the anode of the first diode connected between the first current limiter and the third current limiter, the cathode of the second diode connected between the second current limiter and the fourth current limiter; and an output terminal connected to an output of the comparator.

2. In the circuit according to claim 1 wherein the input terminal is connected to a sensor circuit emitting a sensed signal the input terminal as a function of a sensed parameter.

3. In the circuit according to claim 1 wherein the first input terminal of the comparator is a non-inverting input.

4. In the circuit according to claim 3 wherein the second input terminal of the comparator is an inverting terminal.

5. In the circuit according to claim 1 wherein the second input terminal of the comparator is an inverting terminal.

6. In the circuit according to claim 1 wherein the comparator comprises a differential amplifier.

7. In the circuit according to claim 1 wherein a plurality of voltage supply connections feed the voltage supply.

8. In the circuit according to claim 1 wherein at least one of the first current limiter, the second current limiter, the third current limiter and the fourth current limiter is a resistor.

9. In the circuit according to claim 1 wherein the output terminal is connected to an output circuit comprising a optoelectronic isolator having an output section connected to the data bus.

10. In the circuit according to claim 1 further comprising a current limiter connected to and between the voltage supply and the output terminal.

11. In the circuit according to claim 10 wherein the current limiter comprises a resistor.

* * * * *